United States Patent [19]
Nakamura et al.
[11] 3,761,611
[45] Sept. 25, 1973

[54] VIDEO FILE SYSTEM

[75] Inventors: Hisashi Nakamura, Hachioji-shi; Masao Hibi, Kodaira-shi; Toshimichi Terada, Hachioji-shi; Chikafusa Hirano, Minamitama-gun, Tokyo, all of Japan

[73] Assignees: Hitachi Ltd.; Hitachi Electronics Co., Ltd., Tokyo, Japan

[22] Filed: June 18, 1971

[21] Appl. No.: 154,563

[30] Foreign Application Priority Data
June 23, 1970 Japan ................................ 45/54628

[52] U.S. Cl. ..... 178/6.6 A, 178/6.6 FS, 179/100.2 B
[51] Int. Cl. .... G11b 15/00, G11b 27/32, H04n 1/28
[58] Field of Search ............ 178/6.6 A, 5.6, 6.6 FS; 179/100.2 MD, 100.2 B

[56] References Cited
UNITED STATES PATENTS

| | | | |
|---|---|---|---|
| 3,535,440 | 10/1970 | Watanabe | 178/6.6 A |
| 3,594,729 | 7/1971 | Vemura | 178/6.6 A |
| 3,493,674 | 2/1970 | Houghton | 178/5.6 |
| 3,539,712 | 11/1970 | Stephens | 178/6.6 A |
| 3,446,914 | 5/1969 | Hodge | 178/5.6 |
| 3,504,115 | 3/1970 | Suzuki et al. | 178/5.6 |

*Primary Examiner*—Bernard Konick
*Assistant Examiner*—Stuart N. Hecker
*Attorney*—Craig, Antonelli & Hill

[57] ABSTRACT

A magnetic recording and reproducing system for recording video signal information for many scenes in groups on a magnetic recording medium as well as recording control signals in the neighborhood of the individual groups of the video signal information. A desired one of said control signals may be extracted in accordance with external instructions, and the system itself operates to select other specified video signal information in accordance with the extracted control signal and couple the selected information to other apparatus.

7 Claims, 8 Drawing Figures

INVENTORS

HISASHI NAKAMURA, MASAO HIBI,

TOSHIMICHI TERADA, CHIKAFUSA HIRANO,
KOJI NAKAMURA

BY Craig, Antonelli & Hill

ATTORNEYS

INVENTORS

HISASHI NAKAMURA, MASAO HIBI,

TOSHIMICHI TERADA, CHIKAFUSA HIRANO,
KOJI NAKAMURA

BY Craig, Antonelli & Hill

ATTORNEYS

INVENTORS

HISASHI NAKAMURA, MASAO HIBI,

TOSHIMICHI TERADA, CHIKAFUSA HIRANO,

KOJI NAKAMURA

BY Craig, Antonelli & Hill

ATTORNEYS

VIDEO FILE SYSTEM

BACKGROUND OF THE INVENTION

1. Field of the Invention

This invention relates to magnetic video tape recording and reproducing devices, and more particularly to a video file system using a device capable of recording and reproducing a large number of still pictures (video frame signals) which are picked-up from video signals picked-up or extracted by a pickup tube such as a television camera, namely, a video tape recorder.

2. Description of the Prior Art

There have heretofore been proposed recording and reproducing systems for recording television video signal information in the form of many different frames together with address codes accompanying the individual frames and selectively reproducing desired frames by specifying the corresponding addresses. These systems, however, can only reproduce specified frames according to external selection instructions given from a separate keyboard or electronic computer, but they cannot select by themselves the specified frames. More particularly, these systems do not have the function of, for instance, selectively reproducing a desired frame as soon as the user pushes a particular one of a certain number of push buttons corresponding to a plurality of different picture frames indicated within a reproduced picture. This has only been realized with external control means such as an electronic computer.

SUMMARY OF THE INVENTION

The principal object of the present invention is to provide a recording and reproducing system having the function of selecting the desired record information and coupling it to other apparatus not under the control of an external, mechanically complicated control means but under the control of a control means provided within the system itself, that is, having a programing function.

Another object of the invention is to provide a recording and reproducing system, in which many static picture signals and select control signals to subsequently and selectively display a certain picture in connection with a picture on display are recorded on a magnetic medium and desired video signals are reproduced by itself according to external instructions.

A further object of the invention is to provide a recording and reproducing system, which is simple in construction and inexpensive and has a programing function.

A still further object of the invention is to provide a system, which is effective to record and reproduce the control signals noted above.

To achieve the above objects, the invention features a magnetic recording and reproducing system for selectively recording and reproducing information such as video signals or video signals plus accompanying audio signals, said information including address signals introduced within the video signals or the audio signals accompanying the video signals, the address signals introduced within the information for one scene indicating a certain number of scenes to be subsequently and selectively displayed in connection with said one scene, said system comprising means to produce control signals corresponding to said respective address signals, means to record said control signals in groups for the respective scenes, means to recover said recorded control signals, and means to selectively provide a control signal in a group for one scene when a corresponding address signal introduced for the same scene is specified, said selected control signal being used to control the selection of relevant information and coupling of the relevant information to external apparatus.

The above and other objects, features and advantages of the invention will become more apparent from the following description of a preferred embodiment of the invention, with reference to the accompanying drawing.

DESCRIPTION OF THE PREFERRED EMBODIMENT

Figure 1A:
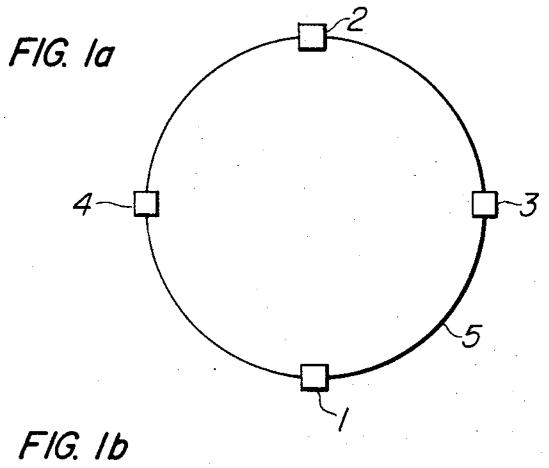
FIGS. 1*a* and 1*b* are schematic plan and side views showing a rotary magnetic head assembly used in one embodiment of the invention.
Figure 1B:
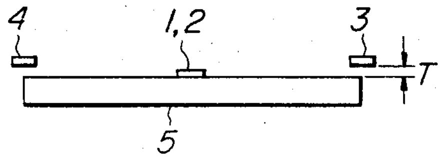

One embodiment of the invention (shown in FIGS. 3*a* and 3*b*) uses a rotary magnetic head assembly as shown in FIGS. 1*a* and 1*b*.

FIG. 1*a* is a schematic plan view of the rotary magnetic head assembly, and FIG. 1*b* is a schematic side view thereof. Reference numeral 5 designates a rotary cylinder, which carries magnetic heads 1 and 2 for recording and reproducing television signals (as individual frames representing respective static pictures).

Figure 2:
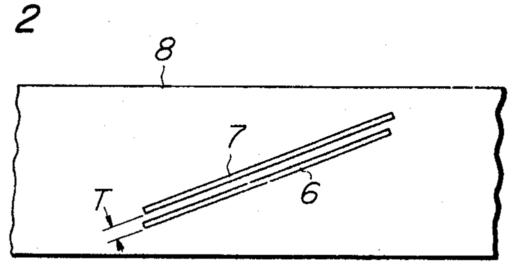
FIG. 2 is a fragmentary view of a magnetic tape scanned by the above magnetic head assembly for recording video signal information and control signal information.

FIG. 2 shows a magnetic tape 8, on which the television signal information is recorded as recording tracks as typically shown at 6 by the magnetic heads 1 and 2. The rotary magnetic head assembly also comprises magnetic heads 3 and 4 for recording and reproducing address signals. The magnetic heads 3 and 4 are spaced by a gap T from the plane of revolution of the magnetic heads 1 and 2, so that their locus with respect to the magnetic tape 8 gives a track as indicated at 7, which is spaced by a distance T from the track 6.

Figure 3A:
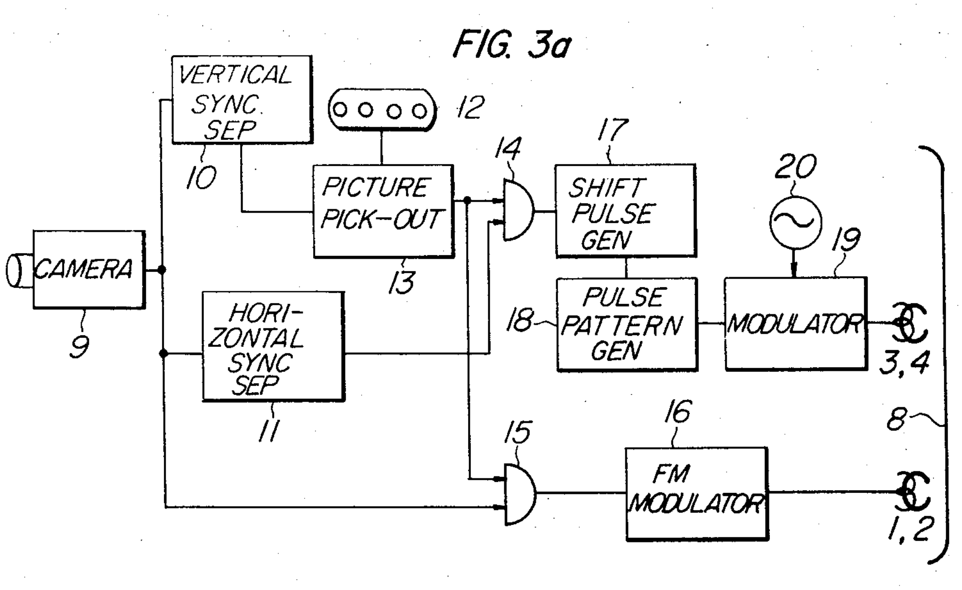
FIGS. 3*a* and 3*b* are block diagrams showing one embodiment of the magnetic recording and reproducing system according to the invention.
Figure 3B:
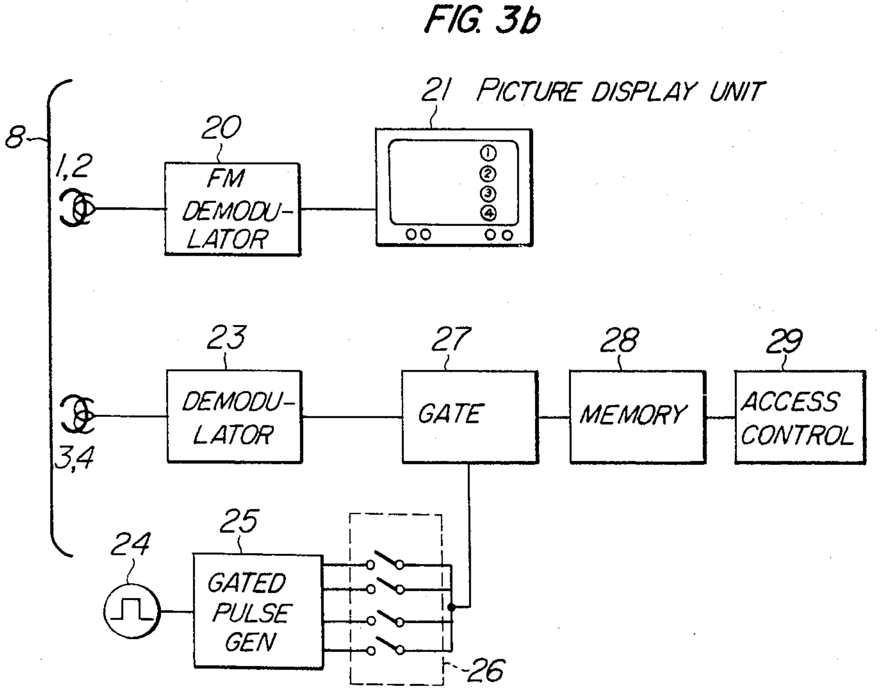

FIGS. 3*a* and 3*b* show one embodiment of the magnetic recording and reproducing system utilizing a video tape recorder according to the invention. It consists of a recording section and a reproducing section, particularly the one having programing function. In this embodiment, use may be made of control means for and the mechanical construction of the drive means to drive the magnetic recording medium such as magnetic tape, which are well known in the art and will not be described herein.

FIG. 3*a* shows the recording section for recording the output of a television video signal generator 9 such as a well-known television camera image pick-up tube. Alternatively, the recording section may record a signal derived from received television signal free from carrier wave. The output signal of the television video signal generator 9 is fed to a horizontal synchronizing signal separating circuit 11 to obtain the horizontal synchronizing signal. The output of the generator 9 is also fed to a vertical synchronizing signal separating circuit 10 to obtain the vertical snychronizing signal.

When the operator watching a monitor television screen, upon finding a desired scene to be recorded, depresses a record command button, a picture pick-out circuit 13 produces a pick-out pulse with a pulse duration of just one frame (period required to scan one picture frame) in synchronism with the vertical synchronizing signal from the vertical snychronizing signal generating circuit 10 (receiving the output signal of the television video signal generator 9). Upon appearance of a pickout pulse, gate circuits 14 and 15 are opened to permit the respective horizontal synchronizing signal and video signal for the selected period of one frame. The video signal thus picked out is converted by an FM modulator 16 into a FM signal, which is recorded through the magnetic heads 1 and 2 on the magnetic tape 8.

Meanwhile, the horizontal synchronizing signal permitted through the gate 14 is coupled to a shift pulse generator 17, which provides shift pulses required to record address signals in a predetermined number corresponding to predetermined portions in the picture. The shift pulses from the shift pulse generator 17 are fed to a pulse pattern generator 18, which has stored therein a number of bits necessary to produce required addresses, and whose content is successively read out in accordance with the incoming shift pulses to provide a corresponding pulse pattern. The number of bits necessary depends upon the quantity of information to be recorded. In this embodiment, 5 bits are provided to produce four binary codes, to facilitate the description. The individual codes indicate respective frames to be selected in connection with a prevailing picture being displayed. The addresses indicating these frames may be in any form (such as numerals, alphabet characters or Japanese syllabraries). In this embodiment, four of these addresses are represented by respective binary codes. For example, Address code 1 is represented by . . . . . 10111,
Address code 2 is represented by . . . . . 11011,
Address code 3 is represented by . . . . . 01111, and
Address code 4 is represented by . . . . . 10001.

Figure 4:
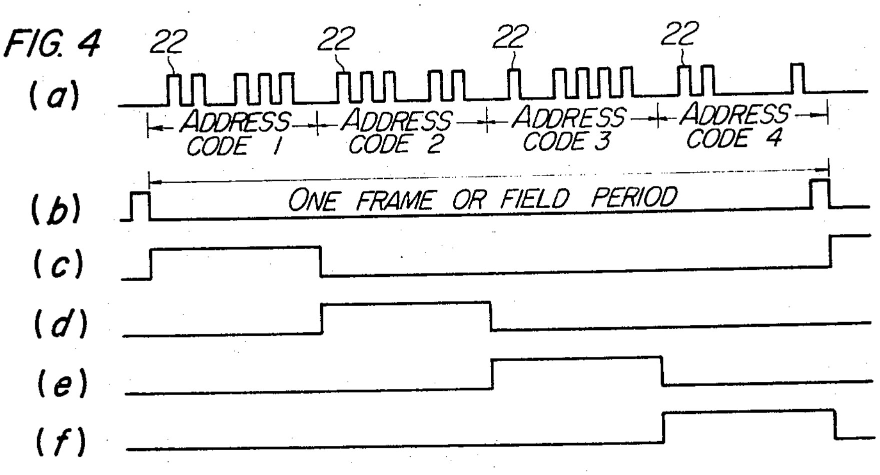
FIG. 4 is a time chart to illustrate the operation of the embodiment of FIGS. 3*a* and 3*b*.

FIG. 4(*a*) shows the individual pulse codes. Each of the pulse codes has a leading pulse 22. In reproduction, the address code begins with the pulse next to the pulse 22. If desired, it is possible to add error correction pulses to the pulse series in each pulse code for the purpose of enhancing the reliability of reproduction.

The output signal of the pulse pattern generator 18 is coupled to a modulator 19, which converts its input into a signal suited for recording, for instance a NRZ1 (non-return-to-zero inverted) wave, FM wave or FS wave, which is recorded through the magnetic heads 3 and 4 on the magnetic tape as track 7. Numeral 20 designates an oscillator.

FIG. 3*b* shows the reproducing section.

In the reproduction, the magnetic tape 8 is held stationary, and the FM signal is recovered by the magnetic heads 1 and 2 and demodulatd by an FM demodulator 20 into the video signal for one frame, which is coupled to a picture display unit 21 for the reproduction of a static picture. The principles so far involved in the reproduction are the same as for the well-known video tape recorder.

Meanwhile, the output signal from the magnetic heads 3 and 4 is coupled to a demodulator 23, which is constructed to repeatedly produce the pulse series of FIG. 4(a). The period of the repetition is one-half the period required for one rotation of the rotary head assembly. Although in this embodiment two magnetic heads 3 and 4 are used for the recording and reproduction of address signals, they may be replaced with a single magnetic head. In such case, the period of the repetition of the pulse series noted above is the same as the period required for one rotation of the rotary head assembly.

Also, a pulse generator 24, which is synchronized to the rotation of the rotary head assembly, provides a pulse signal synchronized to the vertical synchronizing signal. The pulse output of the pulse generator 24 is fed to a gated pulse generating circuit 25, which provides pulse signals of FIGS. 4(*c*), 4(*d*), 4(*e*) and 4(*f*) corresponding to the respective address codes 1, 2, 3 and 4. The pulse generator 24 may be simply constructed, for instance, by suitably combining the iron piece on the rotary side and the coil on the stationary side of the usual video tape recorder.

A group of switches 26 corresponding to the respective address codes are provided on an operating panel not shown. These switches are adapted such that when one of them, for instance the one corresponding to the address code 2 is selectively closed, the pulse signal of FIG. 4(*d*) is obtained. The pulse series of FIG. 4(*a*) is coupled to a gate 27, which permits an address code when a corresponding one of the switches 26 is closed. For instance, the gate 27 permits only address code 2 when the corresponding switch is closed. The address code permitted through the gate 27 is registered in a memory 28, which converts the input series pulses into parallel pulses coupled to an access control circuit 29. The access control circuit 29 controls the tape position to be able to reproduce the frame of the selected adress, for instance address code 2, in the same manner as in the conventional system.

In the preceding embodiment, the address signal and the television signal are recorded by different magnetic heads on different tracks.

Figure 5:
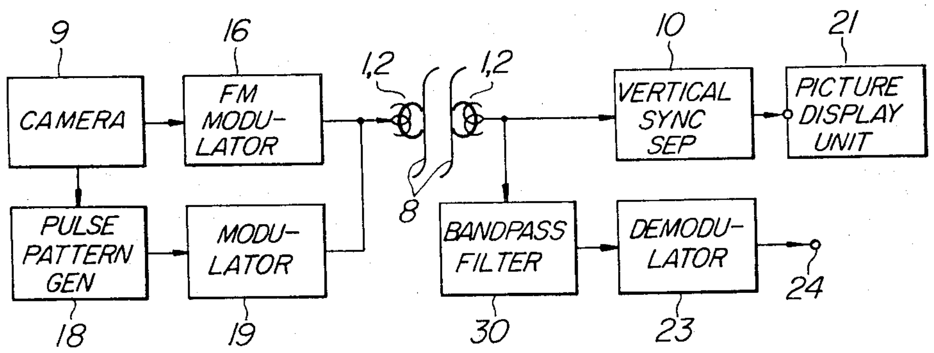
FIG. 5 is a block diagram showing another embodiment of the invention.
Figure 6:
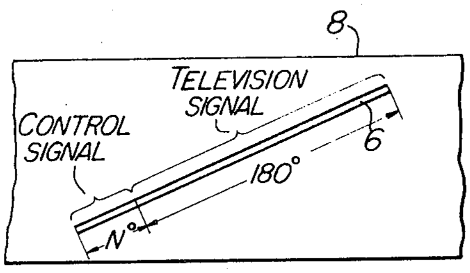
FIG. 6 is a fragmentary view of a magnetic tape used in further embodiment of the invention.

FIGS. 5 and 6 show a second embodiment of the invention. In this embodiment, the address signal is recorded and reproduced without providing any separate magnetic head and any separate track.

Referring to FIG. 5, which shows the second embodiment in which the address signal is superimposed on the television signal on a frequency division basis, the output of a television signal generator 9 is frequency modulated by a FM modulator 16. The output of the television signal generator 9 is also fed to a pulse pattern generator 18, which corresponds to the parts 10, 13, 14, 17 and 18 in the embodiment of FIGS. 3*a* and 3*b*, and whose control signal output is frequency shifted by a frequency shifter 19 to frequencies outside the frequency band of the television video signal (for instance, 200 kHz for the pulse series "0" and 400 kHz for the pulse series "1.") The output of the frequency shifter is recorded together with the FM television signal output of the FM modulator 16 through magnetic heads 1 and 2 on magnetic tape 8. In reproduction, the frequency shifted control signal is separated by a bandpass filter 30 and demodulated by a demodulator 23 to obtain the original control signal. The parts 20 and 21 are the same as those in the embodiment of FIGS. 3a and 3b.

FIG. 6 shows a magnetic tape used in a further embodiment of the invention. In this embodiment, the magnetic tape is wound on a rotary drum assembly by an angle greater than 180° by N degrees, so that the control signal may be recorded on the extra portion of the track corresponding to the extra angle of N degrees. In reproduction, the magnetic heads 1 and 2 are switched when they reach the boundary between both the signals, namely the video signal and the control signal. The control signal is adapted to be recovered when the magnetic heads 1 and 2 scan the portion of the track corresponding to the extra N degrees.

In a further embodiment, the control signal may be recorded during the horizontal retrace period of the television signal. In this multiplex recording, the television signal may be recorded without being interrupted.

In the preceding embodiments, the information has been handled as static video signals. In case the information partly or totally represents moving scenes, use may be had to the sound of the audio signals accompanying the part of the information corresponding to moving scenes to indicate the afore-mentioned addresses (1, 2, 3 and 4) in place of indicating them in the picture on display.

Also, though in the preceding embodiments record tracks are formed at certain angles with respect to the direction of travel of the tape, it will be apparent that similar effects may be obtained with disk type or drum type recording media capable of random access.

We claim:

1. A video tape recording and reproducing system for selectively recording and reproducing video signals, one scene to be displayed by said video signals indicating a plurality of marks associated with the content of the displayed scene, said system comprising:

a. means for producing control signals corresponding to said respective marks;

b. means for recording said control signals in groups for respective scenes on a recording medium in the vicinity of a recording track of the medium on which said video signals are recorded;

c. means for retrieving one video frame signal and said control signals in the group in reproduction;

d. means for specifying one of said marks by an operator to thereby select one of said control signals in the group corresponding to said specified one mark; and e. means responsive to said selected control signal for actuating a drive circuit for selecting the subsequent video frame signal to be displayed or coupling the subsequent video frame signal to an external apparatus.

2. A recording and reproducing system according to claim 1, which further comprises means to frequency shift said control signals to frequencies outside the frequency band of the video signals for multiplex recording together with the corresponding video signals.

3. A recording and reproducing system according to claim 1, wherein said video signals are representative of a specified video frame signal for a still picture scene, said means for recording including means for maintaining the recording medium in a stationary position and rotary magnetic head means for recording said control signals on said medium.

4. A recording and reproducing system according to claim 3, wherein said means for retrieving a specified video frame signal and said control signals includes means for maintaining the recording medium in a stationary position and means for controlling said rotary magnetic head means to scan said medium.

5. A recording and reproducing system according to claim 1, wherein;

said control signal producing and recording means comprise means to separate horizontal and vertical synchronizing signals from television signal information to be recorded, means to pick out the separated horizontal synchronizing signal for a selected period of one frame in synchromism with the separated vertical synchronizing signal, means to produce shift pulses in accordance with the picked-out horizontal synchronizing signal, a shift register to produce series of control code pulses in accordance with said shift pulses, a modulator to modulate the output of said shift register into a signal suited for magnetic recording, and magnetic head means to convert the output of said modulator into a corresponding magnetism pattern; and said control signal retrieving and selecting means comprise magnetic head means to recover said recorded control signals, a demodulator to demodulate the output of said control signal recovering magnetic head means, a group of switches for specifying one of control signals in a group for one scene, and means to selectively provide one of the control code pulse series from said demodulator in accordance with the signal from said switch group.

6. A magnetic recording and reproducing system according to claim 5, wherein said video signals and said control signals are recorded and reproduced through the same magnetic head means.

7. A recording and reproducing system according to claim 5, wherein the video signal information and control signal information are recorded and reproduced by the same magnetic head means on a time division basis.

* * * * *

UNITED STATES PATENT OFFICE

CERTIFICATE OF CORRECTION

Patent No. 3,761,611 Dated September 25, 1973

Hisashi Nakamura, Masao Hibi, Toshimichi Terada
Inventor(s) Chikafusa Hirano and Koji Nakamura It is certified that error appears in the above-identified patent and that said Letters Patent are hereby corrected as shown below:

Title page, insert the following:

[75] Inventors: Line 4, after "Tokyo" insert

; Koji Nakamura, Kokubunji-shi

Signed and sealed this 16th day of April 1974.

(SEAL)
Attest:

EDWARD M.FLETCHER,JR.
Attesting Officer

C. MARSHALL DANN
Commissioner of Patents